United States Patent [19]
Suzuki et al.

[11] Patent Number: 4,886,943
[45] Date of Patent: Dec. 12, 1989

[54] COORDINATES INPUT APPARATUS

[75] Inventors: Noriyuki Suzuki, Tokyo; Atsushi Tanaka, Kawasaki; Kiyoshi Kaneko, Yokohama; Yuichiro Yoshimura, Tokyo; Shinnosuke Taniishi, Tokyo; Katsuyuki Kobayashi, Tokyo; Shigeki Mori, Tokyo, all of Japan

[73] Assignee: Canon Kabushiki Kaisha, Tokyo, Japan

[21] Appl. No.: 299,440

[22] Filed: Jan. 23, 1989

[30] Foreign Application Priority Data

Jan. 28, 1988 [JP] Japan ................. 63-015989

[51] Int. Cl.$^4$ ............................................. G08C 21/00
[52] U.S. Cl. ..................................... 178/18; 340/706; 367/907
[58] Field of Search .................... 178/18, 19; 340/706; 382/57, 13; 367/127, 907

[56] References Cited

U.S. PATENT DOCUMENTS

4,772,764  9/1988  Dorr ...................................... 178/18

Primary Examiner—Stafford D. Schreyer
Attorney, Agent, or Firm—Fitzpatrick, Cella, Harper & Scinto

[57] ABSTRACT

There is provided a coordinates input apparatus for detecting the coordinates of a point indicated by an instruction pen on a vibration transmitting plate made of a transparent tablet on the basis of the vibration transmission times on this plate. This apparatus comprises: a pen as vibration generating means for generating a vibration; a tablet as a vibration transmitting plate to transmit the vibration generated by the pen; vibration sensors which are arranged on the tablet and detect at a plurality of positions the vibrations transmitted by making the pen come into contact with the tablet; a microcomputer for obtaining the vibration transmission distances from the vibration transmission times of the vibrations detected by the sensors and for calculating the coordinate point on the tablet with which the pen is come into contact; an output device to output the coordinate point calculated by the microcomputer; an erroneous detection discriminating circuit to discriminate whether the coordinate point calculated is the erroneously detected coordinate point or not; and a controller for allowing a correction point calculating means to calculate and output a correction point in place of the erroneously detected coordinate point.

7 Claims, 10 Drawing Sheets

COORDINATES INPUT APPARATUS

BACKGROUND OF THE INVENTION

1. Field of the Invention

The present invention relates a coordinates input apparatus and, more particularly, to a coordinates input apparatus for detecting the coordinates of an instruction point on a vibration transmitting plate on the basis of the vibration transmission time on the vibration transmitting plate.

2. Related Background Art

A coordinates input apparatus, particularly, an apparatus for inputting an instruction point onto a tablet by using an input pen is an input apparatus which is inevitable for a hand writing recognizing system for recognizing hand-written characters or figures in an on-line manner.

In the coordinates input apparatus, the instruction point is frequently erroneously detected due to the causes such as noises or the like. Such an erroneous detection point causes the hand writing shape of the input character or figure to be deformed. Therefore, such an erroneous detection point becomes one of the causes of the erroneous recognition in the hand writing recognizing system. Consequently, a technique to eliminate such an erroneous detection point is very important.

Hitherto, in the above input apparatus, the following systems for eliminating the erroneous detection point have generally been used.

The coordinates input apparatus samples the coordinates of the instruction point every predetermined time (hereinafter, referred to as a sampling time). In general, on the assumption that a distance d between two adjacent sampling points of a hand-written straight line or curve does not exceed a predetermined value $d_{max}$, when the distance d exceeds the value $d_{max}$, the occurrence of the erroneous detection is determined and the instruction points which were sampled after such a determination are regarded as the erroneous detection points and eliminated.

Figure 9:
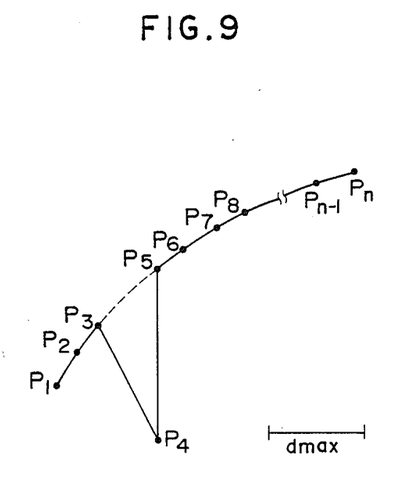
FIG. 9 is an explanatory diagram showing problem in the correction of the erroneous input point.

For instance, as shown in FIG. 9, when there are instruction points $P_1, P_2, \ldots, P_n$ which are time sequentially sampled and an erroneous detection point $P_4$ exists, $$d_{3,4} = \sqrt{(x_3 - x_4)^2 + (y_3 - y_4)^2} > d_{max} \quad (1)$$

(where, $d_{i,i+1}$ denotes a distance between two points $P_i$ and $P_{i+1}$ and $x_i$ and $y_i$ indicate coordinates values of $P_i$). Therefore, $P_4$ is eliminated as an erroneous detection point.

The distance d can be obtained by a method of using the distance of the straight line between two points as shown in the equation (1). In addition to this method, it is also possible to use a method whereby only the components of x and y axes are fetched and the $d_{max}$ is individually discriminated as shown in the following equations (2) and (3).

$$xd_{i,i+1} = |x_i - x_{i+1}| > xd_{max} \quad \ldots (2)$$

$$yd_{i,i+1} = |y_i - y_{i+1}| > yd_{max} \quad \ldots (3)$$

(where, $xd_{i,i+1}$ and $yd_{i,i+1}$ represent components of x and y axes of the distance between two points $P_i$ and $P_{i+1}$)

However, in the foregoing conventional example, when the hand writing is executed at a speed exceeding the $d_{max}$ for the sampling time $\Delta t$, the correct instruction points other than the erroneous detection points due to the noises or the like are also eliminated. That is, a hand writing velocity $v_w$ cannot exceed $$v_w = \frac{d_{max}}{\Delta t} \left( \text{or} \frac{xd_{max}}{\Delta t}, \frac{yd_{max}}{\Delta t} \right) \quad (4)$$

For instance, assuming that $\Delta t = 10$ msec and $d_{max} = 1$ mm, $$v_w = \frac{1 \times 10^{-3}}{10 \times 10^{-3}} = 0.1 \text{ m/sec} = 10 \text{ cm/sec} \quad (5)$$

This value is fairly smaller than the ordinary hand writing speed of tens of cm/sec. This means that according to such a system, characters, images, or the like cannot be input by the ordinary hand writing speed.

It is proper to increase the value of $d_{max}$ to ease the limitation of the hand writing speed. However, the erroneous detection points cannot be sufficiently eliminated by such a method. Therefore, there is a drawback such that if the user tries to eliminate the sufficiently significant erroneous detection points by the conventional technique, the hand writing speed is remarkably limited.

On the other hand, according to the conventional technique, it is impossible to discriminate whether the first sampling point $P_1$ is the erroneous detection point or not. Therefore, when the first point is the erroneous detection point, there is also a drawback such that not only this point cannot be eliminated but also the correct second and subsequent sampling points $P_2$ to $P_n$ after the first erroneous sampling point are erroneously eliminated as the erroneous detection points.

SUMMARY OF THE INVENTION

It is the first object of the present invention to provide a coordinates input apparatus for inputting coordinates by using an instruction pen, wherein the erroneous detection of the coordinate points is discriminated and these coordinate points can be eliminated irrespective of the hand writing speed of the instruction pen.

The second object of the invention is to provide a coordinates input apparatus for inputting coordinates by using an instruction pen, wherein the erroneous detection of coordinate points is automatically discriminated and the coordinate points based on the erroneous detection discriminated are not output.

The third object of the invention is to provide a coordinates input apparatus for inputting coordinates by using an instruction pen, wherein the erroneous detection of coordinate points is automatically discriminated and the coordinate points based on the erroneous detection discriminated are not output but correction points are output in place of the erroneous coordinate points.

BRIEF DESCRIPTION OF THE DRAWINGS

FIG. 8 is an explanatory diagram showing

DESCRIPTION OF THE PREFERRED EMBODIMENT

The present invention will be described in detail hereinbelow with respect to an embodiment shown in the drawings.

Figure 1:
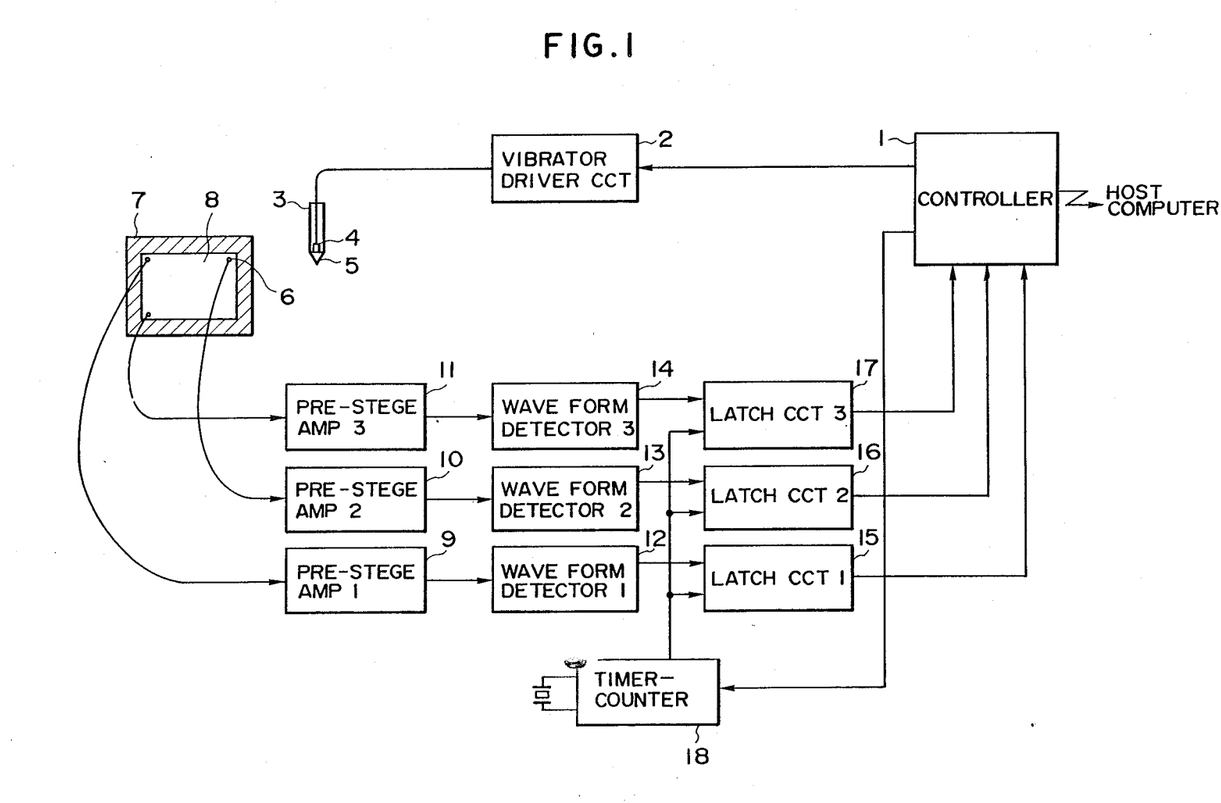
FIG. 1 is an explanatory diagram of a coordinates input apparatus to which the present invention is applied.

FIG. 1 is an arrangement diagram of a coordinates input apparatus to which the invention is applied. In the diagram, reference numeral 8 denotes a vibration transmitting plate to transmit the vibration as an elastic wave and 6 indicates a vibration sensor consisting of a piezoelectric element to detect the elastic wave. The vibration sensors 6 are arranged at three corner positions of the vibration transmitting plate 8 one by one.

Reference numeral 7 denotes a vibration proofing material to prevent the reflection at the edge surfaces of the plate 8.

Figure 2:
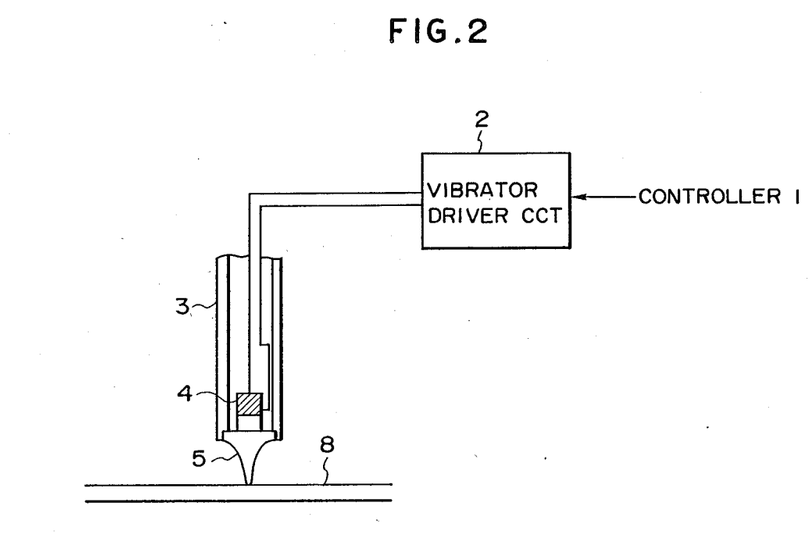
FIG. 2 is an explanatory diagram showing a structure of a vibration pen in FIG. 1.

FIG. 2 shows a structure of a vibration pen 3. A vibrator 4 assembled in the vibration pen 3 is driven by a vibrator driver circuit 2. A drive signal of the vibrator 4 is supplied as a pulse signal at a low level from a controller 1 in FIG. 1 and amplified at a predetermined gain by the vibrator driver circuit 2 which can be driven by a low impedance. Thereafter, the amplified signal is applied to the vibrator 4.

The electrical drive signal is converted into the mechanical ultrasonic vibration by the vibrator 4 and transmitted to the vibration transmitting plate 8 through a horn section 5.

The vibrating frequency of the vibrator 4 is selected to a value such as to enable the vibration transmitting plate 8 made of an acrylic plate, glass, or the like to generate a plate wave. On the other hand, when the vibrator is driven, a vibrating mode such as to allow the vibrator 4 to mainly vibrate in the vertical direction for the plate 8 is selected. Further, by setting the vibrating frequency of the vibrator 4 to the resonance frequency of the vibrator 4, the vibration conversion can be efficiently performed.

The elastic wave which is transmitted to the vibration transmitting plate 8 as mentioned above is the plate wave and has an advantage such that it is hardly influenced by scratches, obstacles, or the like on the surface of the plate 8 as compared with the surface wave or the like.

On the other hand, in FIG. 1, detection signals from the vibration sensors 6 are amplified by pre-stage amplifiers 9 to 11 and input to waveform detectors 12 to 14. The waveform detectors 12 to 14 detect the arrival timings of predetermined waveform components by waveform processing the detection signals, respectively. Time information of a timer 18 is latched to latch circuits 15 to 17 by detection outputs of the waveform detectors 12 to 14.

The time information latched in the latch circuits 15 to 17, that is, the arrival time information of the elastic waves from the input point to the vibration sensors 6 are input to the controller 1. The controller 1 calculates the coordinates of the input point from the latched time information in a manner as will be explained hereinlater and inputs the calculated coordinates to another information processing apparatus such as a computer or the like.

Figure 3:
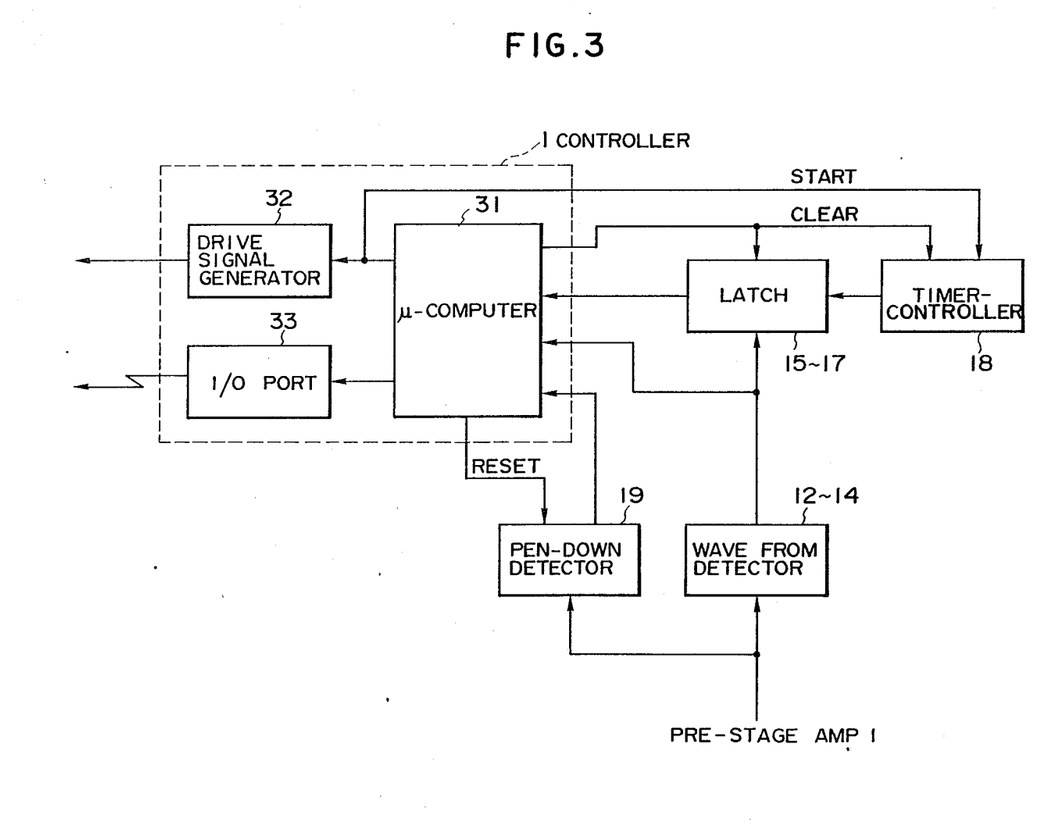
FIG. 3 is a block diagram of a coordinates detecting system.

The control which is executed by the controller 1 to each circuit will now be described in detail with reference to FIG. 3. In the diagram, reference numeral 31 denotes a microcomputer constituting the controller 1. The microcomputer has therein an ROM (Read Only Memory), an RAM (Random Access Memory), and an internal counter.

The microcomputer 31 first resets the latch circuits 15 to 17, timer 18, and a pen-down detector 19 by a clear signal. The pen-down detector 19 detects that the vibration pen was put on the vibration transmitting plate 8 by detecting the vibration waveform when the vibration pen is come into contact with the plate 8. The pen-down detector 19 is reset so as to detect a new pen-down signal by the clear signal. The latch circuits 15 to 17 clear the latched contents. After the timer 18 cleared the count value to 0, it is set to the input waiting mode of the start signal.

Next, start signals are sent from the microcomputer 31 to a drive signal generator 32 and timer 18. In response to the start signal, the drive signal generator 32 generates a pulse train having a repetitive period of the resonance frequency of the vibrator 4 and outputs to the vibrator driver circuit 2.

On the other hand, the timer 18 starts to count the clocks of the period corresponding to the necessary resolution. An output signal from the drive signal generator 32 is amplified by the vibrator driver circuit 2 and drives the vibrator 4 of the pen.

The elastic wave generated by the vibration of the pen passes in the vibration transmitting plate 8 and reaches the vibration sensors 6. The vibration is converted into the electric signal by each sensor 6. The electric signals are input to the waveform detectors 12 to 14 through the pre-stage amplifiers 9 to 11.

The latch circuits 15 to 17 latch the output of the timer 18 by using the detection signals as triggers. These detection signals are also output to the microcomputer 31. On the basis of these detection signals, the microcomputer 31 fetches the data held in the latch circuits.

In this manner, the transmission times of the direct wave and reflected waves can be measured. The microcomputer 31 detects the coordinate values from the data of the transmission time of the direct wave and the transmission times of the reflected waves and transfers to an information processing apparatus as a host computer through an input/output port 33 (consisting of, for instance, an RS-232C port or the like).

Subsequently, in order to obtain the coordinate values of the next input point which is continuously input, the control from the clearing operations of the latch circuits and timer is repeated.

If none of the direct wave and reflected waves is detected even after the lapse of the time which is determined by the maximum transmission time, circuit delay time, and the like after the pen had been driven (that is, after the start signal had been output), this means that the vibration pen 3 is away from the vibration transmitting plate 8, namely, in the pen-up state. Therefore, the measurement of the transmission time is stopped and the control from the clearing operations mentioned above is repeated.

By executing the control and processes as explained above, the coordinates of the instruction point can be detected in a real-time manner.

Figure 4:
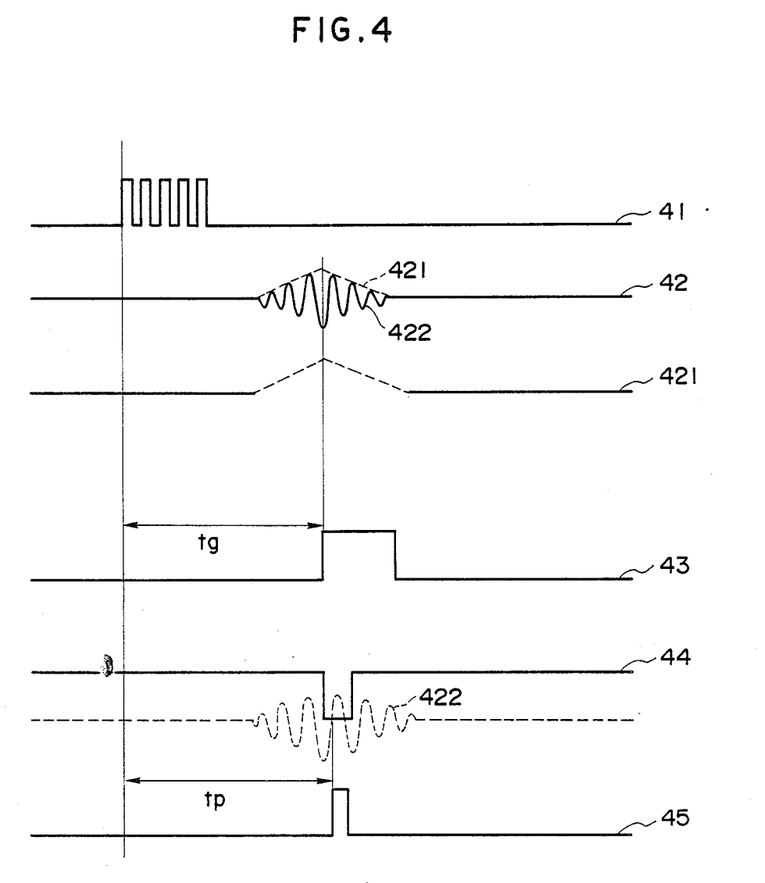
FIG. 4 is a waveform diagram showing the waveform detecting process to detect coordinates.

FIG. 4 shows signal waveforms from the vibration sensors 6 which are input to the waveform detectors 12 to 14 in FIG. 2 and the processes to measure the vibration transmission times based on these signal waveforms.

In FIG. 4, reference numeral 41 denotes drive signal pulses which are applied to the vibration pen 3. The ultrasonic vibration which is input to the vibration transmitting plate 8 from the vibration pen 3 driven by such a waveform progresses for the time corresponding to the straight line distance until each sensor 6 and, thereafter, it is input to the sensor 6.

In FIG. 4, reference numeral 42 denotes a signal waveform detected by the sensor 6. In the embodiment, the plate wave to be transmitted is the dispersive wave and the relation between an envelope 421 and a phase 422 of the detected waveform changes in dependence on the transmission distance.

It is now assumed that for a progressing velocity of the envelope, a group velocity is $V_g$ and a phase velocity is $v_p$. From the difference between the group velocity and the phase velocity, the distance between the vibration pen 3 and the vibration sensor 6 can be detected.

First, when an attention is paid to only the envelope, the velocity is $v_g$ and if a point on a special waveform, e.g., a peak is detected as shown by reference numeral 43 in FIG. 4, the distance d between the pen and the sensor is expressed by $$d = v_g \cdot t_g \quad (6)$$

where, the transmission time is set to $t_g$. Although this equation relates to only one sensor, the same equation is also satisfied with respect to the other remaining two sensors.

The processes based on the detection of a phase signal are executed to determine the coordinate values with a further high accuracy. Assuming that the time from a special detection point of the phase waveform 422 in FIG. 4, for instance, from the vibration applied point to the zero-cross point after the signal passed through the peak is $t_p$, the distance d between the pen and the sensor is expressed by $$d = n \cdot \lambda_p + v_p \cdot t_p \quad (7)$$

where, $\lambda_p$ is a wavelength of the elastic wave and n is an integer.

Figure 5:
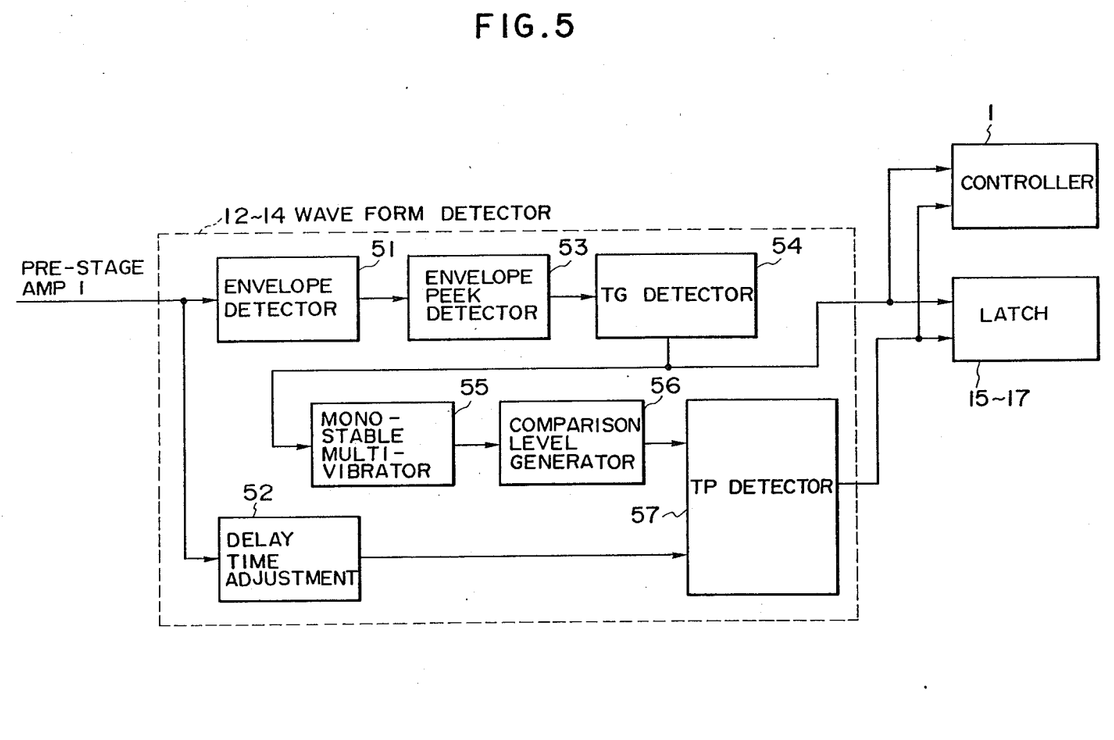
FIG. 5 is a block diagram of a signal waveform detector.

From the equations (6) and (7), the integer n is expressed by $$n = int[(v_g \cdot t_g - v_p \cdot t_p)/\lambda_p + 1/N] \ldots \quad (8)$$

where, N is a real number other than 0 and is set to a proper numerical value. For instance, when N = 2, if the detecting accuracy of the envelope peak lies within a range of $\pm \lambda_p/2$, n can be decided. By substituting the value of n obtained in this manner to the equation (7), the distance between the pen and the sensor can be accurately calculated. The measurement of the two vibration transmission times $t_g$ and $t_p$ shown in FIG. 4 is executed by the waveform detectors 12 to 14. The waveform detectors 12 to 14 are constructed as shown in FIG. 5.

In FIG. 5, the output signals of the vibration sensors 6 are input to an envelope detector 51 consisting of an absolute value circuit, a low pass filter, and the like through the pre-stage amplifiers 9 to 11 and only the envelopes of the detection signals are extracted. The timings of the extracted envelope peaks are detected by an envelope peak detector 53 consisting of a differentiating circuit and the like. A signal $T_g$ to measure the time $t_g$ is formed from the peak detection signal by a signal detector 54 consisting of a comparator and the like. The respective signals $T_g$ are supplied to the controller 1 and latch circuits 15 to 17. A $T_p$ detector 57 operates for only a predetermined period of time after the detection of the signal $T_g$ by a mono-stable multivibrator 55 and a comparison level generator 56. Due to this, the zero-cross point after the peak is detected and the signal $T_p$ to detect the time $t_p$ is formed.

In general, assuming that the number of vibration sensors 6 is h, h detection signals of the envelope transmission times $T_{gl}$ to $T_{gh}$ and h detection signals of the phase transmission times $T_{pl}$ to $T_{ph}$ are formed, respectively. The output of the timer 18 is latched into the latch circuits 15 to 17 by using each of the detection signals as a trigger. Since the counting operation of the timer 18 is started synchronously with the vibration input timing as mentioned above, the data indicative of the transmission times of the envelope and phase are latched to the latch circuits 15 to 17.

Further, the controller 1 receives the data held in the latch circuits 15 to 17 each time on the basis of each of the detection signals. In this manner, the envelope and phase transmission times for each sensor are measured.

Figure 6:
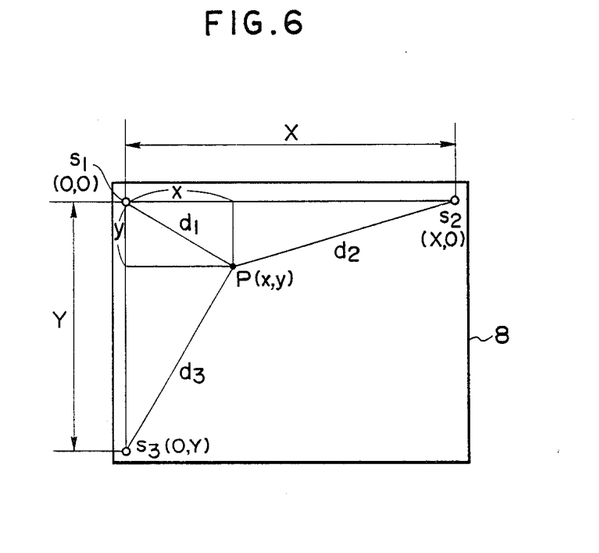
FIG. 6 is an explanatory diagram showing an arrangement of the vibration sensors.

When calculating the coordinate values, the number of vibration sensors 6 can be set to an arbitrary value of 2 or more. In the case of the embodiment, the sensors are arranged at the corner positions $S_1$ to $S_3$ of the vibration transmitting plate 8 as shown in FIG. 6.

The straight line distances $d_1$ to $d_3$ from the input point to the sensors can be obtained by the processes explained in conjunction with the FIGS. 4 and 5. Further, the orthogonal coordinates (x, y) of the input point P can be calculated by the controller 1 by the following equations on the basis of the straight line distances $d_1$ to $d_3$ in FIG. 6.

$$x = X/2 + (d_1 + d_2)(d_1 - d_2)/2X \quad (9)$$

$$y = Y/2 + (d_1 + d_3)(d_1 - d_3)/2Y \quad (10)$$

where, X and Y indicate distances between the origin position $S_1$ and the position $S_2$ and between $S_1$ and $S_3$.

A method of discriminating erroneous detection points regarding the present invention will now be explained. As mentioned above, the coordinate values are obtained from the distances $d_1$, $d_2$, and $d_3$ on the basis of the equations (9) and (10). However, the distance between the instruction point and each sensor can be inversely calculated from the coordinate values. That is, $$l_1 = \sqrt{x^2 + y^2} \qquad (11)$$

$$l_2 = \sqrt{(X - x)^2 + y^2} \qquad (12)$$

$$l_3 = \sqrt{x^2 + (Y - y)^2} \qquad (13)$$

(where, $l_n$ represents a distance between the instruction point and the sensor which is obtained by the inverse calculation)

If the sampling point is correct, the following relation will be satisfied between $d_n$ and $l_n$.

$$d_n \delta l_n \qquad (14)$$

The reason why the relation between both sides in the equation (14) is expressed by $\delta$ (equality or approximation) instead of = (equality) is because it is unavoidable that slight errors occur due to causes such as digitization error in the measurement of the vibration transmission times, attaching accuracies of the sensors, arithmetic operation errors in the calculation of the coordinate values, and the like.

Figure 8:
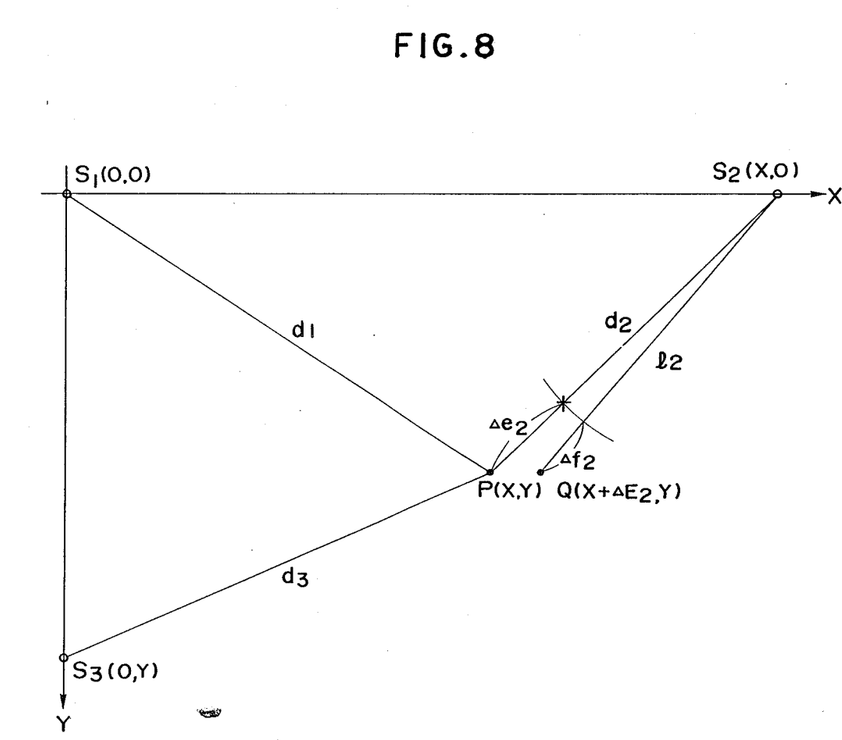

However, in the case of the erroneous detection points which are caused due to the causes of the noises or the like, the equation (14) cannot be satisfied. For example, as shown in FIG. 8, it is now assumed that for the input of the instruction point P(x, y), the distance $d_2$ was erroneously measured by the amount of $\Delta l_2$ due to the influence by the noises or the like. In this case, according to the coordinate values obtained by the equations (9) and (10), point Q is determined instead of point P. That is, $$x + \Delta\epsilon_2 = \frac{X}{2} + \frac{d_1^2 - d_2^2 + 2d_2\Delta l_2 - (\Delta l_2)^2}{2X} \qquad (15)$$

$$\therefore \Delta\epsilon_2 = \Delta l_2 \cdot \frac{2d_2 - \Delta l_2}{2X} \qquad (16)$$

The x coordinate is shifted by only $\Delta\epsilon_2$. $l_2$ which is inversely calculated from the coordinate values of the point Q is $$l_2 = \sqrt{(X - x + \Delta\epsilon_2)^2 + y^2} \qquad (17)$$

On the other hand, the measured distance $d_2 - \Delta l_2$ (hereinafter, generally referred to as $d'_n$) is $$d'_2 = \sqrt{(X - x)^2 + y^2} - \Delta l_2 \qquad (18)$$

Therefore, only the following difference occurs between $l_2$ and $d'_2$.

$$\Delta f_2 = l_2 - d'_2 \qquad (19)$$
$$= \sqrt{(X - x + \Delta\epsilon_2)^2 + y^2} -$$
$$\sqrt{(X - x)^2 + y^2} + \Delta l_2$$

The same shall also apply to $d'_1$, $d'_3$, $l_1$, and $l_3$. Therefore, the erroneous detection point can be discriminated by checking whether or not $$\Delta f_n \, \delta 0 \qquad (20)$$

In other words, the vibration transmission distance measured is compared with the vibration transmission distance obtained by inversely calculating the coordinate values and a check is made to see if there is the significant difference between them The above processes are executed by using the microcomputer 31. However, since it is troublesome to perform the calculation of the square root to obtain ln by the microcomputer, it is also possible to use a method of comparing the square values of the measured distance and of the distance obtained by the inverse calculation. That is, the difference between them is calculated as follows.

$$\Delta g_n = (l_n)^2 - (d'_n)^2 \qquad (21)$$

and a check is made to see if $$\Delta g_n \delta 0 \qquad (22)$$

On the other hand, $$\Delta h_n = \frac{(l_n)^2 - (d_n)^2}{d'_n} \quad (\simeq 2\Delta f_n) \qquad (23)$$

is obtained and a check is made to see if $$\Delta h_n \, \delta 0 \qquad (24)$$

As mentioned above, even in the case of the correct detection point, a slight difference occurs between $d'_n$ and $l_n$. In this case, the magnitudes of $\Delta f_n$, $\Delta g_n$, and $\Delta h_n$ are about $$\Delta f_n \approx \frac{v_p}{\phi} \qquad (25)$$

$$\Delta g_n \approx X \cdot \frac{v_p}{\phi} \text{ or } Y \cdot \frac{v_p}{\phi} \qquad (26)$$

$$\Delta h_n \approx 2 \frac{v_p}{\phi} \qquad (27)$$

(where, $\phi$ denotes a clock frequency of the timer 18 and $\approx$ indicates approximation) On the other hand, there is the following relation between the resolution and the coordinates detection accuracy $\Delta x$ or $\Delta y$.

$$\Delta x \text{ or } \Delta y \approx i \cdot \frac{v_p}{\phi} \qquad (28)$$

(where, i is a numerical value of about 1 to 5) Therefore, by also considering a slight margin, if there are the following relations, the detection point can be determined to be the erroneous detection point.

$$|\Delta f_n| > \Delta x + \alpha \text{ or } \Delta y + \alpha \qquad (29)$$

$$|\Delta g_n| > X \cdot \Delta x + \alpha \text{ or } Y \cdot \Delta y + \alpha \qquad (30)$$

$$|\Delta h_n| > 2 \cdot \Delta x + \alpha \cdot \Delta y + \alpha \qquad (31)$$

(where, $\alpha$ is a proper margin value)

Figure 7:
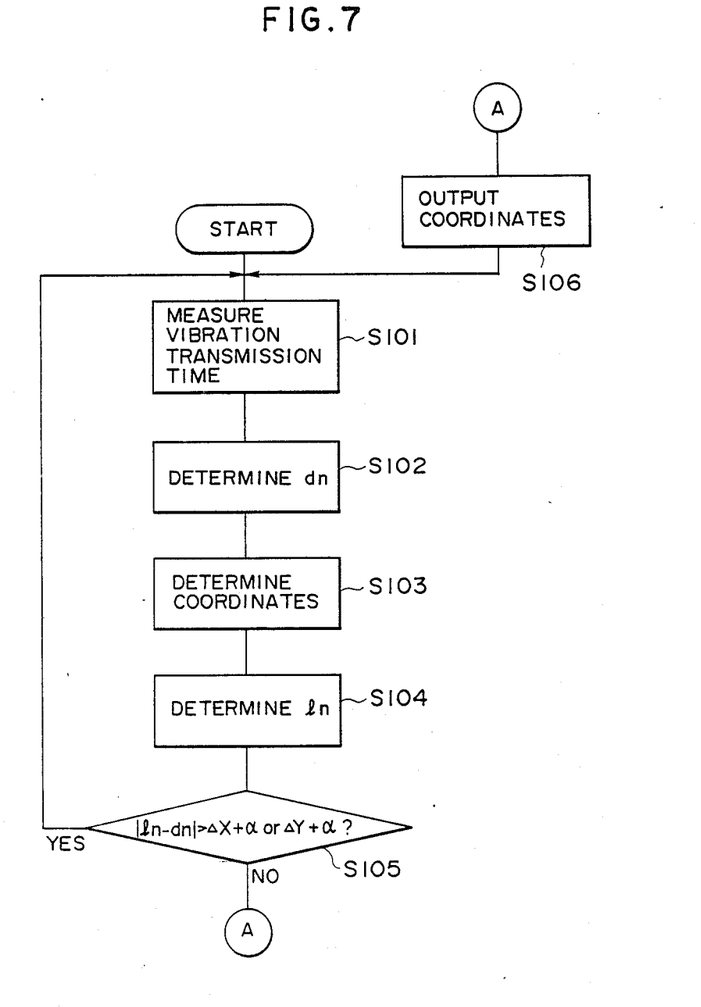
FIG. 7 is a flowchart showing a control procedure when inputting coordinates.

FIG. 7 shows a control procedure of the controller 1 to perform the discrimination mentioned above. Reference character A in FIG. 7 indicates a continuous flow. The procedure of FIG. 7 is stored in the ROM in the microcomputer 31.

First, in step S101, the vibration transmission times $t_{gn}$ and $t_{pn}$ are measured. In the next step S102, the distance $d_n$ is obtained on the basis of the equations (7) and (8). Further, in step S103, the coordinate values (x, y) are calculated by the equations (9) and (10). In step S104, $l_n$ is obtained by the equations (11) to (13). In step S105, $d_n$ and $l_n$ are compared. When $|l_1-d_1|$, $|l_2-d_2|$, or $|l_3-d_3|$ is not larger than $\Delta x+\alpha$ or $\Delta y+\alpha$, the calculated coordinate values are output to the host computer in step S106. After step S106, step S101 follows.

On the other hand, in step S105, if $|l_1-d_1|$, $|l_2-d_2|$, or $|l_3-d_3|$ exceeds $\Delta x+\alpha$ or $\Delta y+\alpha$, the coordinate values are not output. Therefore, only the correct sampling points are output to the host computer. By repeating the above processes, the coordinates are detected.

Although the case of comparing the measured distance with the distance which is inversely calculated from the coordinate values has been described, the vibration transmission time can be also inversely calculated from the coordinate values. Therefore, the erroneous detection point can be also discriminated by the comparison between the measured vibration transmission time and the vibration transmission time which is inversely calculated from the coordinate values.

As described above, according to the embodiment, since the erroneous detection point can be eliminated without limiting the hand writing speed, the input coordinates can be certainly detected without deleting a part of the input information. On the other hand, since the discrimination about the erroneous detection can be independently performed every sampling point, such a situation that the apparatus cannot cope with the erroneous detection of the first point as in the conventional technique can be avoided. Only the erroneous detection points can be certainly eliminated.

A method of recognizing characters or figures by also considering the information of the hand writing speed has been proposed. However, in the case of using such a recognizing method, an inconvenience may occur when using the method of simply eliminating the erroneous detection points as in the foregoing embodiment.

That is, the hand writing speed $v_w$ can be obtained by dividing the distance between two adjacent sampling points by the sampling time.

$$v_w = \frac{P_n P_{n+1}}{\Delta t} = \frac{\sqrt{(x_n - x_{n+1})^2 + (y_n - y_{n+1})^2}}{\Delta t} \quad (32)$$

Figure 10:
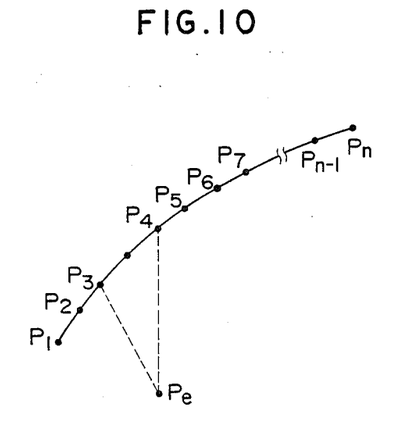
FIG. 10 is an explanatory diagram showing the process when considering a hand writing speed.

In the foregoing embodiment, as shown in FIG. 10, since the erroneous detection point $P_e$ is eliminated and a point train such as $P_1$ to $P_n$ is output, the hand writing speed between $P_3$ and $P_4$ which is obtained by the equation (32) is larger than the inherent hand writing speed.

Figure 11:
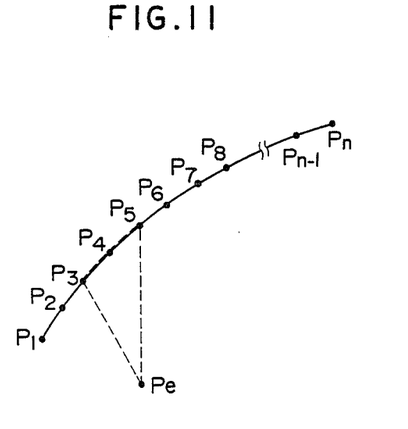
FIG. 11 is an explanatory diagram showing the interpolation of input points.

To prevent such a drawback, it is desirable obtain a certain correction point in place of the eliminated erroneous detection point and to output it. For instance, as shown in FIG. 11, the center point between two points before and after the erroneous detection point is obtained and output in place of the erroneous detection point. That is, after the erroneous detection point $P_e$ was eliminated, point $P_5$ is sampled and the coordinates of the correction point $P_4$ are obtained from the coordinate values of points $P_3$ and $P_5$. Namely, the coordinates ($x_4$, $y_4$) of the correction point $P_4$ can be obtained by $$(x_4, y_4) = \left( \frac{x_3 + x_5}{2}, \frac{y_3 + y_5}{2} \right) \quad (33)$$

The magnitude and direction of the hand writing speed do not largely change for a period of time of about the sampling time. Therefore, the correction point obtained by the equation (33) exists at a position near the inherent instruction point.

As described above, by outputting the correction point which is obtained from an input point train before and after the erroneous detection point in place of the erroneous detection point, it is also possible to sufficiently cope with the recognizing method by considering the information of the hand writing speed.

As will be obvious from the above description, according to the present invention, in a coordinates input apparatus comprising: a vibration pen having vibration generating means; a transmitting plate to transmit the vibration; vibration sensors arranged on the transmitting plate; and means for calculating input coordinate values on the vibration transmitting plate from the transmission times of the vibrations which are input from the vibration pen to the vibration sensors through the vibration transmitting plate, this apparatus has means for inversely calculating the information corresponding to the vibration transmission times or vibration transmission distances from the coordinates values calculated by the calculating means and for checking the resultant information, thereby deleting the coordinates of the erroneous input point. Therefore, it is possible to provide the excellent coordinates input apparatus which can eliminate erroneous detection points without limiting the hand writing speed.

We claim:

1. A coordinates input apparatus comprising:
    vibration generating means for generating a vibration;
    vibration transmitting plate for transmitting the vibration generated by said vibration generating means;
    a plurality of vibration detecting means which are arranged on said vibration transmitting plate and detect at a plurality of positions the vibrations transmitted by making the vibration generating means come into contact with the vibration transmitting plate;
    calculating means for obtaining vibration transmission distances from vibration transmission times of the vibrations detected by said plurality of vibration detecting means and for calculating a coordinate point on the vibration transmitting plate with which the vibration generating means was come into contact;
    output means for outputting the coordinate point calculated by said calculating means;
    erroneous detection discriminating means for discriminating whether the coordinate point calculated by said calculating means is an erroneously detected coordinate point or not; and
    control means for controlling said output means so as not to output the coordinate point when it is discriminated by said discriminating means that the detected coordinate point is the erroneously detected coordinate point.

2. An apparatus according to claim 1, wherein said vibration transmitting plate is made of a transparent material and said output means allows a display apparatus provided under said transparent material to display the coordinate point calculated by said calculating means.

3. An apparatus according to claim 1, wherein said erroneous detection discriminating means has comparing means for comparing the vibration transmission distance measured by said calculating means with a vibration transmission distance which is inversely calculated from the coordinate point and discriminates the erroneous detection of the coordinate point on the basis of the result of the comparison of said comparing means.

4. A coordinates input apparatus comprising:
vibration generating means for generating a vibration;
a vibration transmitting plate for transmitting the vibration generated by said vibration generating means;
a plurality of vibration detecting means which are arranged on said vibration transmitting plate and detect at a plurality of positions the vibration transmitted by making the vibration generating means come into contact with the vibration transmitting plate;
calculating means for obtaining vibration transmission distances from vibration transmission times of the vibrations detected by said plurality of vibration detecting means and for calculating a coordinate point on the vibration transmitting plate with which the vibration generating means is come into contact;
output means for outputting the coordinate point calculated by said calculating means;
erroneous detection discriminating means for discriminating whether the coordinate point calculated by said calculating means is an erroneously detected coordinate point or not;
correction point calculating means for calculating a correction point in correspondence to that it is discriminated by said discriminating means that the coordinate point is the erroneously detected coordinate point; and
control means for allowing said output means to output the correction point in place of the discriminated coordinate point when it is discriminated by said discriminating means that the coordinate point is the erroneously detected coordinate point.

5. An apparatus according to claim 4, wherein said vibration transmitting plate is made of a transparent material and said output means allows a display apparatus provided under said transparent material to display the coordinate point calculated by said calculating means.

6. An apparatus according to claim 4, wherein said erroneous detection discriminating means has comparing means for comparing the vibration transmitting distance measured by said calculating means with a vibration transmission distance which is inversely calculated from the coordinate point and discriminates the erroneous detection of the coordinate point on the basis of the result of the comparison of said comparing means.

7. An apparatus according to claim 4, wherein said correction point calculating means calculates the correction point from two coordinate points which are calculated by said calculating means and are located before and after the coordinate point which is discriminated by said discriminating means to be the erroneously detected coordinate point.

* * * * *

UNITED STATES PATENT AND TRADEMARK OFFICE
CERTIFICATE OF CORRECTION

PATENT NO. : 4,886,943
DATED : December 12, 1989
INVENTOR(S) : NORIYUKI SUZUKI ET AL.                      Page 1 of 2

It is certified that error appears in the above-identified patent and that said Letters Patent is hereby corrected as shown below:

COLUMN 3

Line 13, "showing" should read --showing the process of an erroneous input point;--.

COLUMN 7

Line 15, "$d_n \delta 1_n$  (14)" should read --$d_n \approx 1_n$  (14)--.
Line 18, "$\delta$(equality" should read --$\approx$(equality--.

COLUMN 8

Line 1, "$\Delta f_n \delta 0$  (20)" should read --$\Delta f_n \approx 0$  (20)--.
Line 10, "(n" should read --$\ell$n--.
Line 19, "$\Delta g_n \delta 0$  (22)" should read --$\Delta g_n \approx 0$  (22)--.
Line 29, "$\Delta h_n \delta 0$  (24)" should read --$\Delta h_n \approx 0$  (24)--.
Line 61, "$|\Delta h_n| > 2 \cdot \Delta x + \alpha \cdot \Delta y + \alpha$   (31)" should read
--$|\Delta h_n| > 2 \cdot \Delta x + \alpha$ or $2 \cdot \Delta y + \alpha$   (31)--.

COLUMN 9

Line 12, "$\Delta x + \alpha$or" should read --$\Delta x + \alpha$ or--

COLUMN 10

Line 41, "vibration transmitting plate" should read --a vibration transmitting plate--.
Line 56, "was" should be deleted.

COLUMN 11

Line 34, "is" should be deleted.

UNITED STATES PATENT AND TRADEMARK OFFICE
CERTIFICATE OF CORRECTION

PATENT NO. : 4,886,943
DATED : December 12, 1989
INVENTOR(S) : NORIYUKI SUZUKI ET AL.

It is certified that error appears in the above-identified patent and that said Letters Patent is hereby corrected as shown below:

COLUMN 12

Line 6, "to that" should read --to which--.

Signed and Sealed this

Tenth Day of September, 1991

Attest:

HARRY F. MANBECK, JR.

*Attesting Officer*     *Commissioner of Patents and Trademarks*